Patented Apr. 24, 1951

UNITED STATES PATENT OFFICE

2,550,503

GRANULAR POLYVINYL RESINS

Norris Turnbull, Grand Island, N. Y., assignor to E. I. du Pont de Nemours & Company, Wilmington, Del., a corporation of Delaware No Drawing. Application July 1, 1947, Serial No. 758,483

16 Claims. (Cl. 260—27)

This invention relates to the production of polyvinyl resins in granular form and more particularly to a means for preventing coalescence of the granules.

Thermoplastic vinyl resins such as polyvinyl acetate may be produced in granular form by various methods. One form is "bead" polyvinyl acetate, consisting of smooth spherical particles which may be made in various sizes. Another form consists of small particles of irregular shape. Such granular material is convenient to handle in various operations such as measuring and dissolving. However, since polyvinyl acetate is thermoplastic and exhibits considerable cold flow at ordinary temperatures, it often is necessary to refrigerate this material during storage to prevent coalescence of the particles to large masses which are then difficult to dissolve. Such refrigeration is costly and undesirable.

It has been found advantageous to prepare beads or granules of polyvinyl acetate by polymerizing the monomer dispersed in water containing a small amount of surface active compound as a dispersing agent. These beads can be prepared with a high degree of uniformity which is of considerable importance in solution operations.

The wet beads obtained, after polymerization generally are centrifuged to remove a large proportion of the external water and are then dried with warm air. In order to dry the beads at a reasonable rate, it is necessary to use a drying temperature of 40°–80° C. Under these conditions, unlubricated beads will agglomerate to form large lumps. The dried beads will also agglomerate on storage at ordinary temperatures in the absence of a lubricant.

Magnesium stearate and other lubricants applied to the granules have proved to be very effective in preventing agglomeration of polyvinyl acetate in plant practice, but they are insoluble in the organic solvents commonly used for dissolving the polymer and give an undesirable cloud to the resulting solutions.

An agent is desired which is soluble in organic solvents commonly used for dissolving polyvinyl acetate, such as benzene, acetone, ethanol, methanol and the like, and which will prevent the agglomeration of the polyvinyl acetate particles during processing and storage.

The problem of agglomeration is not confined to polyvinyl acetate but occurs likewise with polymers of other vinyl esters of carboxylic acids and copolymers of such vinyl esters, which have thermoplastic properties similar to those of polyvinyl acetate. Such thermoplastic properties are generally shared by the various polymers of esters of carboxylic acids, for example, polymers of vinyl formate, propionate, benzoate, naphthoate and stearate. The thermoplastic properties of vinyl ester copolymers depend upon the proportion of the vinyl ester in the copolymer, the nature of the copolymerized constituent or constituents and the degree of polymerization. Generally, those copolymers of vinyl acetate or other vinyl ester in which the vinyl ester is the preponderant constituent have thermoplastic properties which tend to cause agglomeration of granules. For example, copolymers of vinyl acetate with vinyl chloride containing upwards of 80% by weight of the acetate generally are sufficiently thermoplastic to cause agglomeration during storage.

An object of the present invention is to provide an improved means for preventing agglomeration of granular polymers and copolymers of vinyl esters of carboxylic acid. A further object is an anti-agglomeration agent which is soluble in commonly-used polyvinyl ester solvents. Other objects will be hereinafter apparent.

The above objects may be attained in accordance with the present invention by applying to the granular thermoplastic polymers and copolymers of vinyl esters of carboxylic acids, and in particular, polyvinyl acetate, a coating or layer of rosin or a product of rosin, including abietic acid, hydrogenated rosin and polymerized rosin. The ordinary rosin of commerce, which is a mixture of diterpene carboxylic acids, chiefly abietic acid, is effective as an anti-agglomerant. Refined grades of rosin and the so-called polymerized rosins are still more effective. Other types of processed rosins, e. g. hydrogenated rosins also may be used with satisfactory results. Abietic acid also is effective. Either crude or refined forms of rosin or these rosin products may be used.

The rosin may be applied to the granular vinyl resin in any desired manner, so as to coat the surfaces of the granules therewith, and relatively small amounts are required. An amount sufficient to give the generally glossy surface of the vinyl resin granules a somewhat dull appearance is generally very effective. The amount required will vary, depending on the state of subdivision of the granular resin, as the amount of surface to be coated varies inversely with granule size. Generally less than 5% by weight of rosin will suffice and in most cases about 0.5 to 1% gives good results. For large-size vinyl resin beads or particles, e. g. 0.1 to 0.3 inch in diameter, still smaller amounts of rosin, e. g. as low as 0.1% by weight, can be used. The above percentages are based on the dry weight of the vinyl resin.

Various means for coating the vinyl resin particles with the rosin may be used, and any conventional method which will produce the coating is satisfactory. The vinyl resin particles may be either dry, or wet with water or other non-solvent, when the rosin is applied. A convenient and preferred method is to mix the granular vinyl resin with finely powdered rosin, e. g. about 50 to 100 mesh size rosin. Another method is to add the finely divided rosin to a slurry or dispersion of the granular vinyl resin in water, remove the water by centrifuging, filtration or other conventional means of separation, and drying the granular material. I may also apply the rosin in solution in a liquid which dissolves rosin but is a non-solvent for the vinyl resin. For this purpose, low-boiling hydrocarbons may be used as rosin solvents, for example, petroleum ether, gasoline, hexanes, heptanes, and the like. Such rosin solutions may be added to wet or dry granular vinyl resin or to a slurry or dispersion thereof.

In the manufacture of granular or bead-form polyvinyl acetate, wherein the granular material is produced by polymerization of an aqueous dispersion of vinyl acetate in water, I prefer to mix the powdered rosin with the wet, granular polyvinyl acetate and then evaporate off the water by any conventional drying operation. The granular polymer removed from the polymerization reactor is centrifuged and washed with water to remove dispersing agents and other contaminants which may result from the polymerization operation. The resulting wet, granular polymer, having an average particle size of about 0.5 to 2 mm., is thoroughly mixed with about 0.5 to 1% by weight of powdered rosin of about 50 to 100 mesh size. Various conventional methods and apparatus for mixing solid materials may be utilized for this purpose, e. g. tumbling the mixture in a rotating drum or other container. The mixed material is then dried at a temperature of 40 to 100° C. in a rotary dryer or other conventional drying equipment, preferably tumbling or stirring the material while drying. The drying temperature must be sufficiently low to maintain the polymer in a substantially non-tacky condition. The polymer granules tend to become tacky and stick together and to the dryer walls at lower temperatures when wet, than when dry. The initial temperature in the dryer may vary from 40 to 60° C. without undue sticking. As the drying operation proceeds, the temperature can be raised, to finish at 60 to 100° C., substantially without sticking. Generally a maximum drying temperature not exceeding about 100° C. is satisfactory; but the maximum drying temperature will vary, depending on the specific grade of polyvinyl acetate handled. The resulting rosin-coated granular material has a somewhat dull appearance, as compared with untreated granular polyvinyl acetate and is substantially free of lumps or other agglomerations. It may be stored under ordinary storage and shipping conditions for long periods of time, substantially without agglomeration or adherence of the granules.

The experimental tests shown by the following "examples," utilizing the apparatus and procedure described below, illustrate specific modes of practicing the invention and the results obtained:

Apparatus

A rotary dryer was constructed using a 500 ml. bottle supported on small casters placed in a water bath. The bottle was stoppered with a rubber stopper through the center of which a ⅜ inch hollow shaft, 8 inches in length, extended 1 inch into the bottle. A roller bearing was attached near the other end of the shaft to act as a support. The bottle and shaft were rotated by means of a belt and pulley arrangement attached to an air motor. A glass tube inserted through the hollow shaft to near the back end of the bottle was used for conducting air through the dryer. The off-gas was also vented through the hollow shaft. Two 6 inch rods of glass or steel were placed in the dryer to assist in mixing the beads. The temperature of the water bath, in which the dryer revolved, was controlled by injection of steam.

Procedure

Polyvinyl acetate beads of about 0.5 to 2 cm. in diameter prepared by polymerizing an aqueous dispersion of vinyl acetate, were washed with water on a filter. A 25 gram sample of the resulting wet beads, containing about 10% by weight of water, was thoroughly mixed with an amount of the rosin to be tested, equivalent to 0.6% of their dry weight. The rosin was finely divided, about 50 to 100 mesh size. The flow characteristics of the moist beads then were noted.

The beads then were placed in the bottle which was to serve as the rotary dryer and the bottle was attached to the drying assembly. The bottle was submerged to about ⅓ of its diameter in the water bath which had an initial temperature varying between 40 and 60° C. The temperature was controlled during the initial stages of the drying at a value which would not allow sticking of the beads to themselves or to the glass. (This wet stage offers the greatest difficulty in the drying operation and selection of the proper temperature for use with various lubricants requires considerable experience. After the major portion of the surface water is removed, the temperature can normally be increased fairly rapidly to a maximum between 60° and 100° C., depending upon the lubricant and the type of vinyl resin.) The effectiveness of the various rosins tested was determined by noting the behavior of the beads during the wet stage and by noting the temperature at which the beads would begin to stick together as the temperature was gradually increased. (Inferior lubricants permit agglomeration of the beads during the wet stage at 40° C. or during the dry stage at temperatures below 50° C.)

The dried beads were stored in a 45° C. oven for several days or weeks and at room temperature for one year, to determine the effectiveness of the rosin to prevent agglomeration during storage.

Solutions of the dried beads in benzene, ethanol, and acetone were prepared for examination as to clarity.

In Example 3 below, the polyvinyl acetate was a medium viscosity grade, having a viscosity of 70 centipoises. In the remaining examples, the polyvinyl acetate was of the low-viscosity type, having viscosities of 3 to 17 centipoises, as indicated. In each case, the viscosity noted is the viscosity of a benzene solution containing 86 grams per liter of dry polyvinyl acetate, i. e. a so-called molar solution.

The above described apparatus and procedure were employed in carrying out the following examples:

*Example 1*

Wet polyvinyl acetate beads (5 cp. viscosity), containing 10% by weight of water were mixed with a finely divided partially polymerized rosin equivalent to 0.6% by weight of the beads on a dry basis. The beads then exhibited an improvement in their flow characteristics. They were then charged into the rotary dryer heated in a 41° C. water bath and air was passed through the dryer. The temperature of the bath was raised gradually to 73° C. within 30 minutes. The granules were then dry and free-flowing and did not agglomerate during storage at 45° C. for 7 days.

*Example 2*

Wet polyvinyl acetate beads (5 cp. viscosity) containing 10% by weight of water were mixed with finely ground refined rosin equivalent to 0.6% by weight of the beads on a dry basis. These coated beads exhibited good flow characteristics. The mixture was then charged into the rotary dryer in a 43° C. water bath and air was passed over the beads. The temperature of the bath was raised to 73° C. during 25 minutes and the charge was dry after a total of 30 minutes. The granules were free-flowing, did not stick to the walls of the dryer and did not agglomerate during storage at 45° C. for 7 days.

*Example 3*

Wet polyvinyl acetate beads (70 cp. viscosity) were mixed with 0.6% of their dry weight of finely divided abietic acid. The granules were dried as in Examples 1 and 2, except that the dryer was heated in a 60° C. bath for one hour. Due to the relatively high initial temperature (60° C.), some of the beads stuck to the dryer walls at the start of the run. However, at the end of the run, all of the granules were free-flowing, discrete particles.

*Example 4*

Wet polyvinyl acetate beads (10 cp. viscosity) containing approximately 10% by weight of water were mixed with a refined rosin powder equivalent to 0.6% by weight on the dry basis. The coated granules, which exhibited improved flow characteristics, were charged into the rotary dryer heated at 40° C. Within three minutes, the surface moisture had been reduced to the point that the granules were free-flowing like sand. The temperature of the bath was raised within 57 minutes to 66° C. at which temperature the beads were free-flowing. The resulting dry, granular polymer did not agglomerate during storage at 45° C. for 7 days.

*Example 5*

Wet polyvinyl acetate beads (17 cp. viscosity) were mixed with a powdered hydrogenated rosin equivalent to 0.6% by weight on the dry basis. The coated granules exhibited fair wet flow. The wet beads coated with the rosin were placed in the dryer heated in the bath at 37° C. The beads quickly stuck to the walls but gradually worked loose on further drying. At the end of 30 minutes, only a few of the granules adhered to the walls when the temperature of the heating bath reached 55° C., and the dried product was free from agglomerates.

Solutions of the lubricated, dried beads produced in the above examples (20% solids) were prepared and examined for clarity with the following results:

| Example and Lubricant | 20% Lubricated Polyvinyl Acetate Solutions in | | |
|---|---|---|---|
| | Benzene | Ethanol | Acetone |
| Example 1, Poly-Pale Resin | Clear | Clear | Slightly turbid.[1] |
| Example 2, N Wood Rosin | do | do | Do.[2] |
| Example 3, Abietic Acid | Slightly turbid.[2] | do | Do.[1] |
| Example 4, Pexite M Resin | Clear | do | Do.[1] |
| Example 5, Staybellite Resin | do | Slightly turbid.[2] | Do.[1] |

[1] Turbidity due entirely to polyvinyl acetate, as the lubricant is soluble in indicated solvents used in these tests.
[2] Turbidity due to trace of lubricant which is insoluble in the indicated solvents.

Samples of the polyvinyl acetate beads prepared in the above examples were stored in closed containers at room temperature, alongside samples of unlubricated polyvinyl acetate beads of the same viscosity grades. After one year storage the lubricated beads were free-flowing, whereas the unlubricated beads were caked due to adherence of adjacent beads.

The herein described invention permits rapid drying of the wet granular polymer at relatively high temperatures without agglomeration or sticking to the walls of the dryer. It further produces a product which can be stored for long periods of time without agglomeration or caking. The product dissolves in the usual vinyl resin solvents to produce from slightly turbid to clear solutions.

I claim:
1. The process which comprises applying to the surfaces of a granular, thermoplastic polymerized vinyl carboxylate, in the proportion of 0.1 to 5% of the dry weight of said carboxylate, a rosin product selected from the group consisting of rosin, abietic acid, hydrogenated rosin and polymerized rosin.

2. In a process according to claim 1, coating wet polymerized vinyl carboxylate granules with the rosin product and then drying said granules.

3. In the manufacture of a granular, thermoplastic polymer of a vinyl carboxylate by a process including polymerizing an aqueous dispersion of monomer, the steps comprising coating the resulting wet granular polymer with about 0.1 to 5% of its dry weight of a rosin product selected from the group consisting of rosin, abietic acid, hydrogenated rosin and polymerized rosin and then drying said polymer at a temperature of 40 to 100° C.

4. The process of claim 1 in which the polymerized vinyl carboxylate is coated with rosin.

5. The process of claim 1 in which the polymerized vinyl carboxylate is coated with abietic acid.

6. The process of claim 1 in which the polymerized vinyl carboxylate is coated with hydrogenated rosin.

7. The process of claim 1 in which the polymerized carboxylate is coated with polymerized rosin.

8. The process of claim 3 in which the said polymer is polyvinyl acetate and is coated with rosin.

9. The process of claim 3 in which the said polymer is polyvinyl acetate and is coated with abietic acid.

10. The process of claim 3 in which the said polymer is polyvinyl acetate and is coated with hydrogenated rosin.

11. The process of claim 3 in which the said polymer is polyvinyl acetate and is coated with polymerized rosin.

12. A composition of matter comprising granular, thermoplastic polymerized vinyl carboxylate, individual granules of which are coated with about 0.1 to 5% by weight of a rosin product selected from the group consisting of rosin, abietic acid, hydrogenated rosin and polymerized rosin.

13. A composition of matter comprising granular polyvinyl acetate, individual granules of which are coated with about 0.1 to 5% by weight of rosin.

14. A composition of matter comprising granular polyvinyl acetate, individual granules of which are coated with about 0.1 to 5% by weight of abietic acid.

15. A composition of matter comprising granular polyvinyl acetate, individual granules of which are coated with about 0.1 to 5% by weight of hydrogenated rosin.

16. A composition of matter comprising granular polyvinyl acetate, individual granules of which are coated with about 0.1 to 5% by weight of polymerized rosin.

NORRIS TURNBULL.

REFERENCES CITED

The following references are of record in the file of this patent:

UNITED STATES PATENTS

| Number | Name | Date |
|---|---|---|
| 1,923,383 | Lundteigen | Aug. 22, 1933 |
| 2,034,797 | Church et al. | Mar. 24, 1936 |
| 2,063,649 | Woodruff | Dec. 8, 1936 |
| 2,121,397 | Downing et al. | June 21, 1938 |
| 2,245,040 | Marks | June 10, 1941 |
| 2,290,914 | Machlin | July 28, 1942 |
| 2,317,149 | Lemanski | Apr. 20, 1943 |
| 2,345,191 | Gage | Mar. 28, 1944 |